R. B. WILCOX.
FRUIT PITTER.
APPLICATION FILED APR. 8, 1921.
1,421,333.
Patented June 27, 1922.
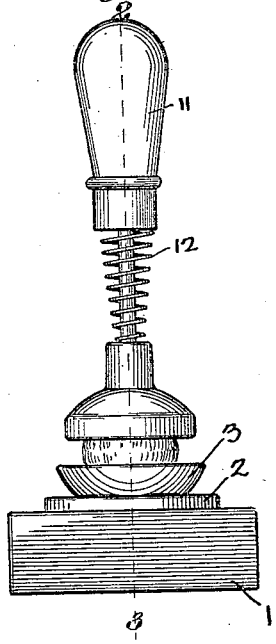
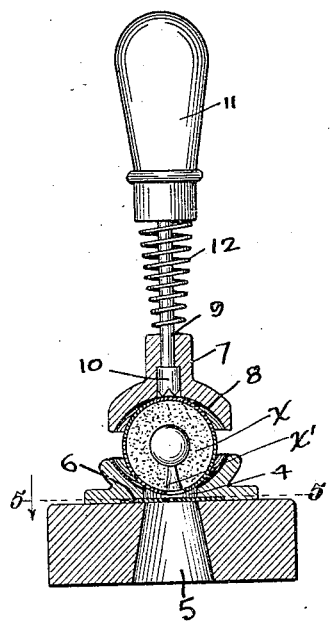
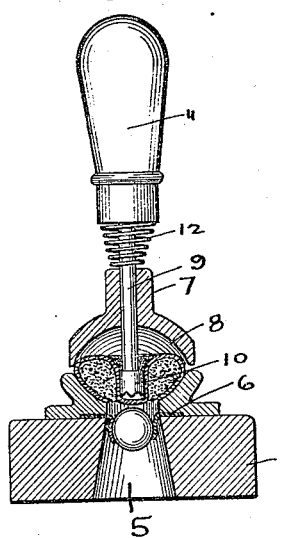
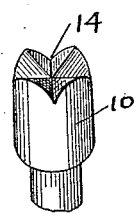
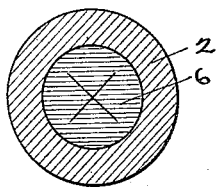
Inventor.
ROBERT B. WILCOX
By Baldwin Vale
Attorney.

UNITED STATES PATENT OFFICE.

ROBERT B. WILCOX, OF THE DALLES, OREGON, ASSIGNOR TO LIBBY, McNEILL & LIBBY, OF CHICAGO, ILLINOIS, A CORPORATION OF MAINE.

FRUIT PITTER.

1,421,333.  Specification of Letters Patent.  Patented June 27, 1922.

Application filed April 8, 1921. Serial No. 459,688.

*To all whom it may concern:*

Be it known that I, ROBERT B. WILCOX, a citizen of the United States, and a resident of the city of The Dalles, county of Wasco, State of Oregon, have made a new and useful invention—to wit, Improvements in Fruit Pitters; and I do hereby declare the following to be a full, clear, concise, and exact description of the same.

This invention relates particularly to instruments for removing the pits, seeds or stones from fruits.

An object of this invention is to provide an instrument for removing pits and the like from fruits without bruising or injuring the body or skin of the fruit and more economically than by any of the present methods, and further that the device will be superior in point of simplicity and inexpensiveness of construction, positiveness of operation, facility and convenience in use and general efficiency. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claim following the description, it is desired to cover the invention in whatsoever form it may be embodied.

In the accompanying one-sheet of drawings,

Figure 1 represents a side elevation of a fruit pitter constructed in accordance with my invention.

Figure 2 represents a vertical section taken through Figure 1 on the line 2—2.

Figure 3 represents a cross-sectional view showing the device in operative position.

Figure 4 represents an enlarged perspective view of the plunger head.

Figure 5 represents a cross-sectional view through Figure 2 on the line 5—5.

Fruits and particularly cherries of the maraschino type are usually pitted before being preserved. The present method of removing the pits is by hand although different types of mechanical devices have been contrived for removing the pits more economically and satisfactorily. The mechanical devices used, generally have pit removing means that pass through the skin and body of the fruit thereby bruising it and detracting from its appearance, furthermore such devices push the pit outwardly through the body of the fruit, tending to tear a jagged opening in that part of the body of the fruit through which the stone has been forced. Fruit that has been so treated does not command as high a market price as where the pitted fruit closely resembles the unpitted article. It is the principal object of my invention to provide a device that will force the pit of the fruit outwardly through the stem opening, which, after the emission will tend to partly close and resume its normal shape.

In detail the construction illustrated in the drawings comprises a table, platform or other supporting device 1 having a suitable sanitary base 2 formed from metal, rubber or other composition mounted thereon. The base 2 is provided with a central depressed or cup-shaped portion 3 in the upper face thereof of a contour adapted to receive any article or fruit to be pitted. The base 2 is provided with an opening 4 therethrough concentric with the depressed portion therein and registering with an opening 5 provided in the platform 1. The bottom face of the base 2 lying against the platform 1 is provided with an internal depression in which a resilient or flexible closure 6 is adapted to be mounted. The central portion of the resilient closure is provided with slits therein and said closure normally tends to prevent any article from passing therethrough otherwise than by under pressure.

In the operation of this device, a fruit X or other article to be pitted would be placed in the bowl 3 of the base 2 with the stem end $X^1$ thereof registering with the opening 4 in said base. The operator would then place a relatively movable member 7 having a cup or dish-shaped face 8 therein into engagement with the exposed portion of the fruit and substantially diametrically opposite the stem portion $X^1$ of said fruit. The cup-shaped face 8 of the member 7 when placed in engagement with the fruit or other article to be pitted tends to hold it snugly in position with the base 1 preventing movement of the said fruit. The movable member 7 is provided with a plunger 9 slidably mounted and retained therein having a head portion 10 adapted to fit into a socket formed in said movable member. The opposite end of the plunger 10 is provided with a handle 11 or other media to be engaged by either a manual or mechanical operating means. An expansion spring 12 is adapted to be interposed between the handle 11 and movable member 7 so as to normally retain the head 10 of the plunger 9 within the socket formed in said member 7. The fruit engaging portion of said plunger head 10 is serrated as at 14 so as to firmly engage the article to be pitted without any slipping or skidding effects.

As shown in Figure 2, the fruit is in position within the co-operating companion, cup-shaped faces 3 and 8 with the stem end registering with the discharge port 4, the plunger head 10 placed diametrically opposite. In this position the operator would move the handle 11 against the tension of the spring 12 to force the plunger head against the skin and body of the fruit or article to be pitted. A continued movement of the plunger head 10 toward the discharge opening 4 would create a pressure on the body of the fruit and against the pit which would tend to move along the line of least resistance downwardly through the stem opening $X^1$. An exaggerated view of this operation is shown in Figure 3 where the pit has been passed through the stem opening by the plunger head 10 engaging the skin and body of the fruit without puncturing or bruising the same. The downward pressure of the plunger forces the pit through the slitted openings in the resilient closure, only permitting articles to be forcibly passed therethrough.

Having thus described this invention, what I claim and desire to secure by Letters Patent is:

A fruit pitter comprising a cup-shaped base member having a central passage therethrough and adapted to contain a fruit to be pitted; a resilient closure covering the passage in said base and provided with slits therein to prevent movement of the fruit to be pitted therethrough; a cup-shaped member adapted to hold the fruit to be pitted in said base; a plunger slidably mounted in said upper cup-shaped member and adapted to engage the fruit to be pitted and to force the pit therefrom through the passage in said base and through the slit provided in the resilient closure in said base; a handle on said plunger and spring means interposed between said handle and movable member for resisting movement of said plunger relative to the upper cup-shaped member.

In testimony whereof, I have hereunto set my hand at The Dalles, Oregon, this 23d day of March, 1921.

ROBERT B. WILCOX.